US008982545B2

(12) United States Patent
Kim et al.

(10) Patent No.: US 8,982,545 B2
(45) Date of Patent: Mar. 17, 2015

(54) CURVED-SURFACE DISPLAY PANEL FABRICATION METHOD, CURVED-SURFACE DISPLAY PANEL USING SAME, AND MULTI-IMAGE DISPLAY DEVICE USING SAME

(75) Inventors: Yong Beom Kim, Incheon (KR); Yang Rae Kim, Incheon (KR)

(73) Assignee: Tovis Co., Ltd., Incheon (KR)

(*) Notice: Subject to any disclaimer, the term of this patent is extended or adjusted under 35 U.S.C. 154(b) by 222 days.

(21) Appl. No.: 13/582,324

(22) PCT Filed: Mar. 2, 2011

(86) PCT No.: PCT/KR2011/001445
§ 371 (c)(1),
(2), (4) Date: Aug. 31, 2012

(87) PCT Pub. No.: WO2011/108848
PCT Pub. Date: Sep. 9, 2011

(65) Prior Publication Data

US 2012/0320509 A1 Dec. 20, 2012

(30) Foreign Application Priority Data

Mar. 4, 2010 (KR) ........................ 10-2010-0019585

(51) Int. Cl.

*H05K 7/00* (2006.01)
*H05K 1/03* (2006.01)
*G02F 1/1333* (2006.01)
*B32B 17/06* (2006.01)

(52) U.S. Cl.

CPC ........ *G02F 1/1333* (2013.01); *G02F 1/133305* (2013.01); *G02F 2001/133302* (2013.01); *G02F 2202/28* (2013.01); *B32B 17/064* (2013.01)

USPC ................. 361/679.21; 361/679.01; 174/255; 445/24

(58) Field of Classification Search

USPC ............ 174/255; 361/679.01, 679.21; 445/24
See application file for complete search history.

(56) References Cited

U.S. PATENT DOCUMENTS 6,104,457 A * 8/2000 Izumi et al. ..................... 349/73
8,139,177 B2 * 3/2012 Nishizawa ...................... 349/58

(Continued)

FOREIGN PATENT DOCUMENTS

JP 63-153223 U 10/1988
JP 2002-214566 A 7/2002

(Continued)

*Primary Examiner* — Jeremy C Norris
*Assistant Examiner* — Nathan Milakovich
(74) *Attorney, Agent, or Firm* — Rabin & Berdo, P.C.

(57) ABSTRACT

A curved-surface display panel fabrication method for fabricating a curved-surface display panel using a flat display panel having a first substrate and a second substrate includes: paring partially outer surfaces of the first substrate and the second substrate so as to reduce thicknesses thereof to a predetermined thickness; bending the pared flat display panel to a desired curved shape; attaching a first guide member which has a shape corresponding to the desired curved shape to the first substrate with a predetermined gap from the pared outer surface thereof and attaching a second guide member with has a shape corresponding to the desired curved shape to the second substrate with a predetermined gap from the pared outer surface thereof; and forming light transmitting reinforcing layers respectively in a space between the first guide member and the first substrate and a space between the second guide member and the second substrate.

18 Claims, 8 Drawing Sheets

170 150 120 130 181 110 140 170 181a

(56) References Cited

U.S. PATENT DOCUMENTS

| | | | | |
|---|---|---|---|---|
| 8,657,456 | B2 * | 2/2014 | Yamagata et al. | 362/97.1 |
| 2005/0117197 | A1 | 6/2005 | Ide | |
| 2006/0098153 | A1 * | 5/2006 | Slikkerveer et al. | 349/187 |
| 2006/0273304 | A1 * | 12/2006 | Cok | 257/40 |
| 2009/0015747 | A1 * | 1/2009 | Nishizawa et al. | 349/58 |
| 2009/0096965 | A1 * | 4/2009 | Nagata | 349/103 |
| 2009/0316062 | A1 | 12/2009 | Nishizawa | |
| 2012/0044618 | A1 * | 2/2012 | Lee | 361/679.01 |
| 2012/0081849 | A1 * | 4/2012 | Hsiao et al. | 361/679.01 |
| 2012/0081874 | A1 * | 4/2012 | Wu et al. | 361/807 |
| 2012/0168058 | A1 * | 7/2012 | Kim et al. | 156/101 |
| 2013/0180653 | A1 * | 7/2013 | Kim et al. | 156/257 |
| 2014/0354938 | A1 * | 12/2014 | Kim | 349/160 |
| 2014/0368782 | A1 * | 12/2014 | Kim et al. | 349/153 |
| 2015/0000823 | A1 * | 1/2015 | Kim et al. | 156/80 |

FOREIGN PATENT DOCUMENTS

| | | | |
|---|---|---|---|
| JP | 2003-280548 | A | 10/2003 |
| JP | 2006-106603 | A | 4/2006 |
| JP | 2009-020168 | A | 1/2009 |
| JP | 2009-115933 | A | 5/2009 |
| JP | 2009-258324 | A | 11/2009 |
| KR | 10-0435826 | B1 | 6/2004 |
| KR | 10-0614419 | B1 | 6/2006 |
| WO | WO 2013035995 | A2 * | 3/2013 |
| WO | WO 2013035996 | A2 * | 3/2013 |

* cited by examiner

CURVED-SURFACE DISPLAY PANEL FABRICATION METHOD, CURVED-SURFACE DISPLAY PANEL USING SAME, AND MULTI-IMAGE DISPLAY DEVICE USING SAME

FIELD OF THE INVENTION

The present invention relates to a curved-surface display panel fabrication method, a curved-surface display panel formed by the method, and a multi-image display device using the same.

BACKGROUND ART

Various display devices have been developed and are being used. A liquid crystal display device which realizes images using liquid crystal is widely used.

Generally, a liquid crystal display (LCD) includes two display panels and a liquid crystal layer disposed therebetween and having a dielectric anisotropy. An electric filed is formed in the liquid crystal layer, and a transmittance of light passing the liquid crystal layer is regulated by regulating amplitude of the electric field so as to obtain a desired image. Such a liquid crystal display is representative one of a flat panel display (FPD), and TFT-LCD which uses thin film transistor (TFT) as a switching element is widely used.

A plurality of display signal lines i.e., gate lines and data lines, a plurality of thin film transistors and pixel electrodes are formed on a lower display panel of the two display panels of the liquid crystal display panel, and a color filter and a common electrode are formed on a upper display panel.

Such a liquid crystal display panel is generally manufactured in a flat shape, so the conventional liquid crystal display panel cannot be used as a curved display.

In order to solve this problem, a flexible liquid crystal display panel which has flexible substrates instead of glass substrates of a conventional liquid crystal display panel so as to be bent by external bending force has been developed.

However, there is a problem that the manufacturing process of the conventional flexible liquid crystal display panel is difficult and the manufacturing cost thereof is high.

Conventionally, in order to realize a multi-layered image with a depth, a method of overlapping a plurality of liquid crystal display (LCD) panels has been introduced.

In this case, there is a problem that a noise (interference pattern) such as wood grain and water wave due to the interference between the overlapped LCD panels occurs. That is, if a plurality of LCD panels having cross stripes by pixels are closely disposed, a noise occurs by the Moire phenomenon.

Technologies for preventing such noises have been introduced. For example, in Korean Patent registration No. 10-0614419 (Applicant: deep video imaging limited, Title of the invention: Multi-layered display), a diffuse layer for diffusing light is interposed between two LCD panels to remove noise by the overlap of the LCD panels.

However, in case of interposing a diffuse layer between two LCD panels, a process of disposing the diffuse layer between the LCD panels and then assembling the same is required, so an additional assembling process is required and the productivity is deteriorated.

DETAILED DESCRIPTION OF THE INVENTION

Technical Problem

The present invention has been made in an effort to provide a curved-surface display panel fabrication method which can produces a display panel having a curved shape through a simple process using a conventional display panel having substrate and a curved-surface display panel which is fabricated by the method.

Furthermore, the present invention has also been made in an effort to provide a multi-image display device in which an image noise generated by the interference between the overlapped display panel can be prevented and the assembling process is simplified.

Technical Solution

In an exemplary embodiment of the present invention, a curved-surface display panel fabrication method for fabricating a curved-surface display panel having a desired curved shape using a flat display panel having a first substrate and a second substrate includes: paring partially outer surfaces of the first substrate and the second substrate so as to reduce thicknesses thereof to a predetermined thickness; bending the pared flat display panel to a desired curved shape; attaching a first guide member which has a shape corresponding to the desired curved shape to the first substrate with a predetermined gap from the pared outer surface thereof and attaching a second guide member with has a shape corresponding to the desired curved shape to the second substrate with a predetermined gap from the pared outer surface thereof; and forming light transmitting reinforcing layers respectively in a space between the first guide member and the first substrate and a space between the second guide member and the second substrate.

The predetermined thickness may be in a range of 50 to 200 μm.

The curved-surface display panel fabrication method may further include attaching a polarizer on at least one of outer surfaces of the first guide member and the second guide member.

The first guide member and the second guide member may be made of glass or acrylic (PMMA, PolyMethly MethAcrylate).

The first guide member and the second guide member may include respectively a spacer to maintain the predetermined gap.

The spacers may include side spacers which are respectively disposed inner edges of the first guide member and the second guide member to maintain the light transmitting reinforcing layer while the light transmitting reinforcing layer is being formed.

The side spacer may include an insertion hole through which a light transmitting reinforcing material for forming the light transmitting reinforcing layer is inserted.

The first guide member and the second guide member may be polarizers.

A curved-surface display panel according to an embodiment of the present invention is fabricated by one of the above-described curved-surface display panel fabrication methods.

In an exemplary embodiment of the present invention, a multi-image display device for realizing a multi-layer image with a depth by overlapping a plurality of two-dimensional images includes: a curved-surface display panel which is fabricated by one of the above-described curved-surface display panel fabrication methods; and a flat display panel which is disposed in front of the curved-surface display panel so as to be overlapped with the curved-surface display panel in a forward-backward direction.

In an exemplary embodiment of the present invention, a curved-surface display panel which is fabricated from a flat display panel having a first substrate and a second substrate facing each other includes: the first substrate and the second substrate outer surfaces of which are partially pared and are bent to have a desired curved shape; a guide member which has a shape corresponding to the desired curved shape and is fixed to one of the first substrate and the second substrate in a state of being apart from the pared outer surface of one of the first substrate and the second substrate to form a space therebetween; and a light transmitting reinforcing layer formed in the space.

The guide member may be a polarizer.

The guide member may include a spacer for maintaining a distance to one of the first substrate and the second substrate.

The spacer may include a side spacer which is disposed at an inner edge of one of the first guide member and the second guide member to maintain the light transmitting reinforcing layer while the light transmitting reinforcing layer is being formed.

Advantageous Effects

According to the present invention, outer surfaces of the first substrate and the second substrate of a conventional flat display panel are partially removed to reduce the thicknesses thereof and then the display panel is bent, and guide members are attached to the first substrate and the second substrate and the light transmitting reinforcing layer is formed to maintain the curved shape, so the curved-surface display panel can be fabricated through simple process.

Further, by using the curved-surface display panel as a rear display of a multi-image display device, the occurrence of the interference pattern (Moire phenomenon) due to the interference of the different pixel patterns can be prevented, and since an additional diffuse layer is not needed, the assembling process of the multi-image display device can be simplified.

DETAILED DESCRIPTION OF THE EMBODIMENTS

Embodiments of the present invention will now be described more fully hereinafter with reference to the accompanying drawings.

Figure 1:
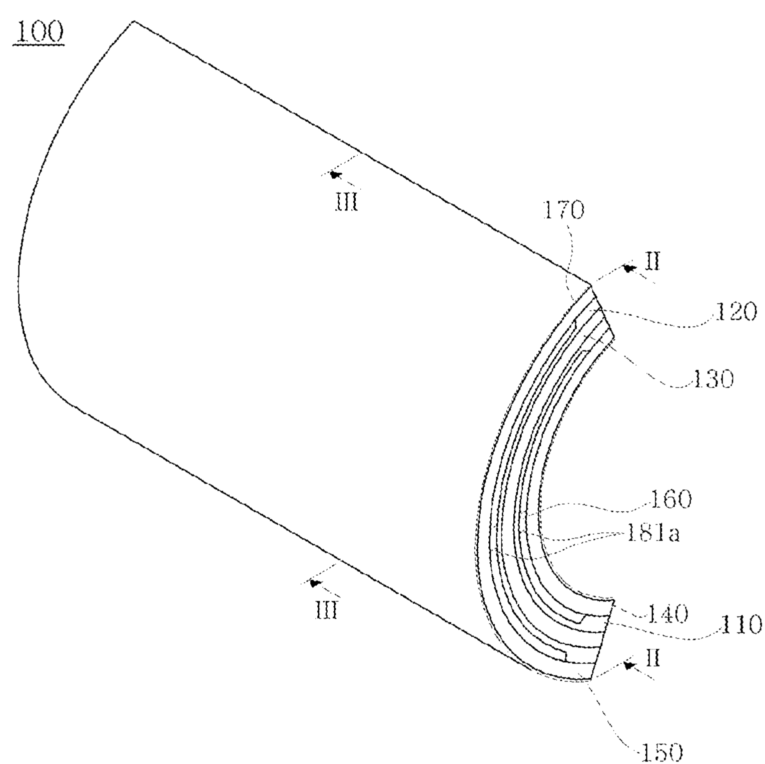
FIG. 1 is a schematic perspective view of a curved-surface display panel formed by a curved-surface display panel fabrication method according to an embodiment of the present invention.

FIG. 1 is a schematic perspective view of a curved-surface display panel formed by a curved-surface display panel fabrication method according to an embodiment of the present invention.

Figure 2:
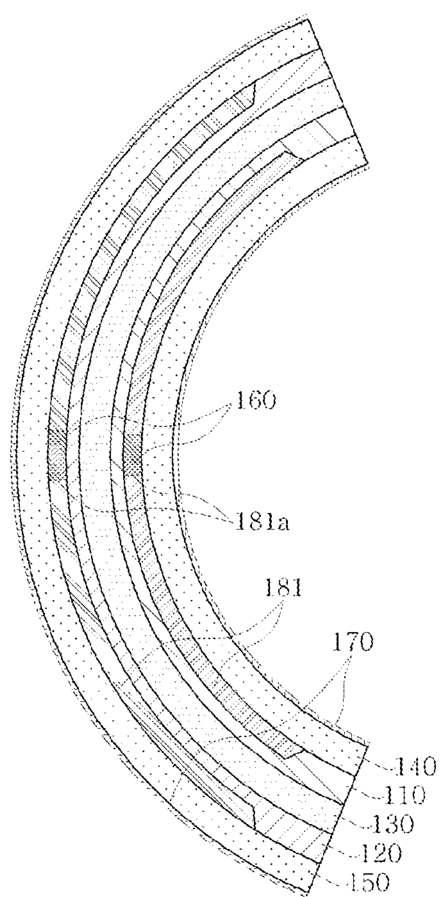
FIG. 2 is a cross sectional view taken along a line—in FIG. 1.
Figure 3:
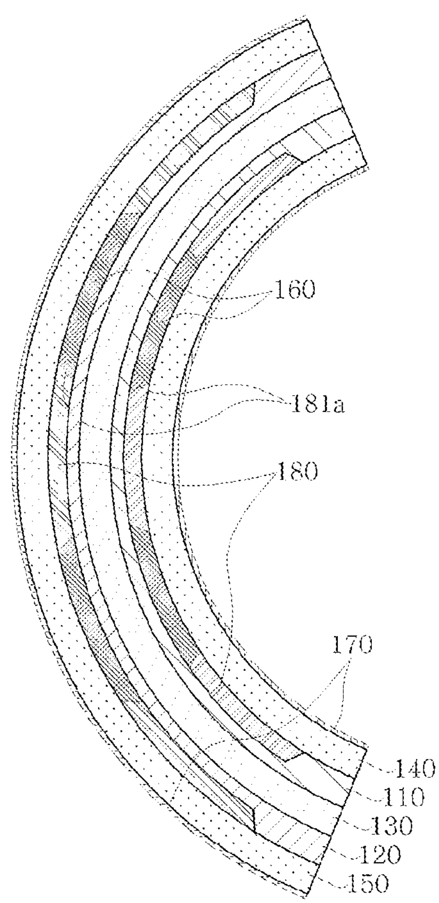
FIG. 3 is a cross sectional view taken along a line—in FIG. 1.

FIG. 2 is a cross sectional view taken along a line—in FIG. 1, and FIG. 3 is a cross sectional view taken along a line—in FIG. 1.

FIG. 4 to FIG. 7 are side sectional views respectively showing a first step to a fourth step of a curved-surface display panel fabrication method according to an embodiment of the present invention.

As shown in FIG. 1 to FIG. 7, a method for fabricating a curved-surface display panel according to an embodiment of the present invention forms a display panel having a desired curved shape using a flat display panel 100*a* (referring to FIG. 4) having a first substrate 110 and a second substrate 120 facing each other.

The flat display panel may be an LCD (liquid crystal display) panel, an OLED (organic light emitting diode display) panel, or the like. At this time, the LCD panel includes a liquid crystal layer between substrates, and the OLED panel includes an organic light emitting layer between substrates.

Exemplarily, a flat display panel 100*a* may be an LCD panel with a flat shape, i.e., a flat LCD panel, which has a first substrate 110 and a second substrate 120 which are made of glass and face each other, and a liquid crystal layer 130 which is interposed between the first substrate 110 and the second substrate 120. Hereinafter, explanation will be made on the assumption that the flat display panel 100*a* is a flat LCD panel. However, the flat display panel 100*a* is not limited to the flat LCD panel.

The first substrate 110 may be referred to as a thin film transistor array substrate, and the second substrate 120 may be referred to as a color filter array substrate.

Meanwhile, not shown in the drawing, at edges of the two substrates 110 and 120, a sealant which is made of material for bonding the two substrates 110 and 120 and forms a space which is filled with liquid crystal, and the liquid crystal is prevented from leaking by the sealant.

A method for forming a curved-surface display panel according to an embodiment of the present invention will be explained hereinafter in detail with reference to FIG. 4 to FIG. 7.

Figure 4:
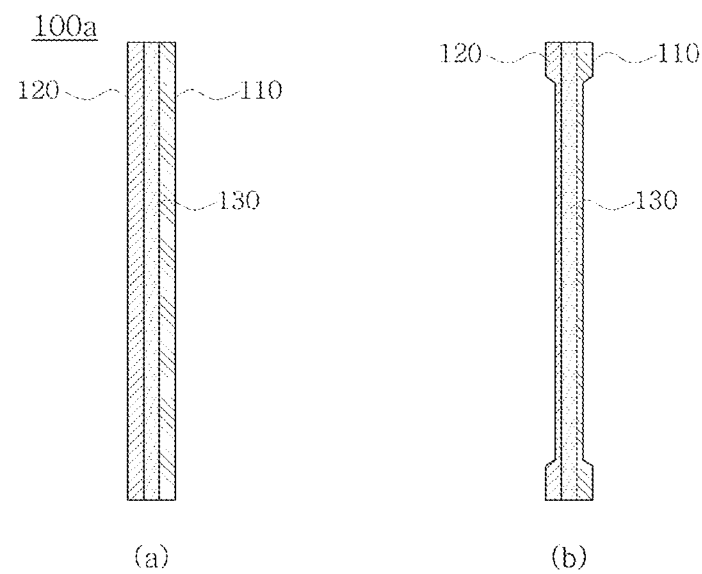
FIG. 4 is a side sectional view showing a first step of a curved-surface display panel fabrication method according to an embodiment of the present invention.
Figure 5:
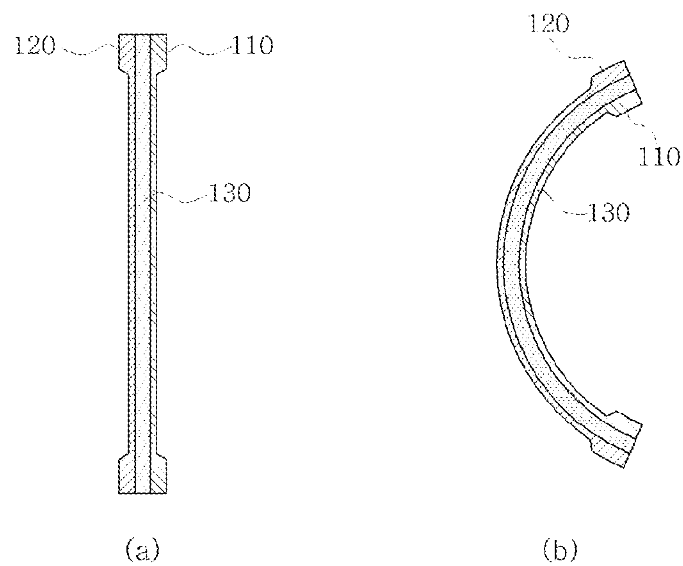
FIG. 5 is a side sectional view showing a second step of a curved-surface display panel fabrication method according to an embodiment of the present invention.
Figure 6:
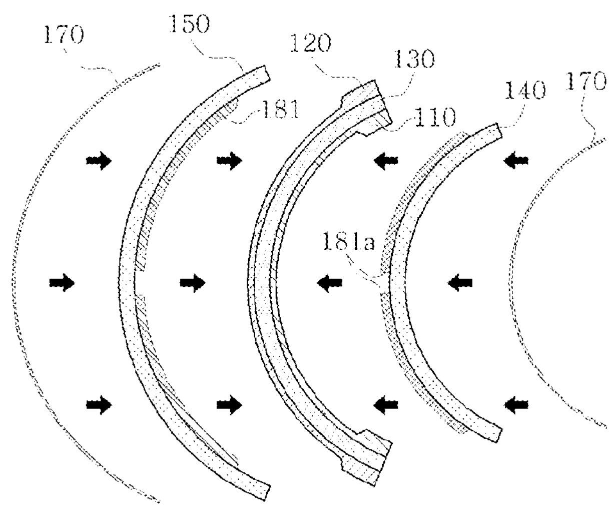
FIG. 6 is a side sectional view showing a third step of a curved-surface display panel fabrication method according to an embodiment of the present invention.
Figure 7:
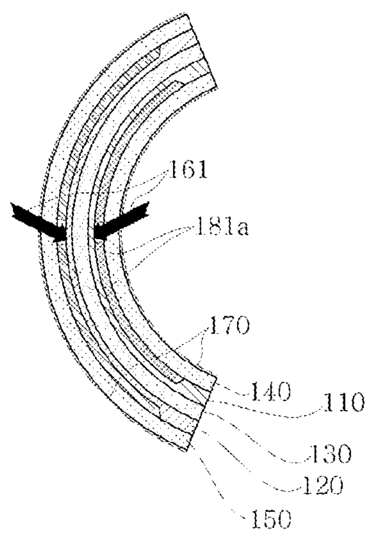
FIG. 7 is a side sectional view showing a fourth step of a curved-surface display panel fabrication method according to an embodiment of the present invention.

A method for fabricating a curved-surface display panel according to an embodiment of the present invention includes: paring partially an outer portion of the first substrate 110 and the second substrate 120 respectively so as to reduce thicknesses thereof to predetermined thicknesses (from (a) to (b) in FIG. 4); bending the pared display panel 100*a* to a desired curved shape (from (a) to (b) in FIG. 5); attaching a first guide member 140 which is formed to have a shape corresponding to the desired curved shape to an outer surface of the pared first substrate 110 with a predetermined gap therebetween and attaching a second guide member 150 which is formed to have a shape corresponding to the desired curved shape to an outer surface of the pared second substrate 120 with a predetermined gap therebetween (FIG. 6); and forming light transmitting reinforcing layers 160 respectively in a space between the first guide member 140 and the first substrate 110 and a space between the second guide member 150 and the second substrate 120 (FIG. 7).

At this time, in the paring partially an outer portion of the first substrate 110 and the second substrate 120 respectively (from (a) to (b) in FIG. 4), the paring can be performed by a conventional method. For example, the paring may be performed by a mechanical grinding method or an etching method using etchant.

Further, it is preferable that upper end edges and lower end edges of the substrates 110 and 120 are not pared. The reason of this is that driving circuits including PCB (Printed Circuit Board) with drivers and various circuit elements for driving the display panel may be connected to an upper end edge or a lower end edge of the display. In addition, since the upper and lower end edges of the substrates are not pared, the upper and lower end edges may be used as mounting positions during attaching the first guide member 140 and the second guide member 150 to the outer surfaces of the first substrate 110 and the second substrate 120 with predetermined gaps.

As shown in FIG. 1 and FIG. 3, the desired curved shape may be a circular arc or a curved surface without an inflection point, and may also be S-shaped shape or a curved shape having one or more inflection points. That is, the desired curved shape may be variously altered.

Further, in the paring step (from (a) to (b) of FIG. 4), the predetermined thickness may be within a range of 50 to 200 μm.

If the thickness of the first substrate 110 and the second substrate 120 after being pared is less than 50 μm or greater than 200 μm, they may be broken during being bent or may be difficult to be bent. That is, since the thickness of the first substrate 110 and the second substrate 120 after being pared is between 50 to 200 μm, the first substrate 110 and the second substrate 120 can be bent without being broken.

In order to maintain the bent state of the display panel 100*a* after the bending the display panel (from (a) to (b) of FIG. 5), it is necessary to form the light transmitting reinforcing layer 160 on the outer surface of the first substrate 110 and the second substrate 120.

In order to stably form the light transmitting reinforcing layer 160, the first guide member 140 and the second guide member 150 which can maintain the flat display panel 100*a* to be bent are attached to the outer surface of the first substrate 110 and the second substrate 120, and this is performed in the step of attaching the guide member (FIG. 6).

At this time, the first guide member 140 and the second guide member 150 are plate members made of transparent or semi-transparent material such as glass or synthetic resin, and may be attached to the outer surfaces of the first substrate 110 and the second substrate 120 by OCA (Optically clear adhesive) or the like.

In order to secure spaces in which the light transmitting reinforcing layer 160 is formed between the first guide member 140 and the first substrate 110 and between the second guide member 150 and the second substrate 120, the first guide member 140 and the second guide member 150 are respectively attached to the first substrate 110 and the second substrate 120 with predetermined gaps therebetween.

At this time, the predetermined gap may be a gap corresponding to the thickness of a pared portion of the first substrate 110 and the second substrate 120. Preferably, the predetermined gap may be a gap which allows the light transmitting reinforcing layer 160 to be formed therein, and may be a gap by which the light transmitting reinforcing layer 160 may disperse or absorb the stress generated in a state of being bent.

When forming the light transmitting reinforcing layer 160 (FIG. 7), in order to form the light transmitting reinforcing layer 160 in the space of the predetermined gap, light transmitting reinforcing material 161 is inserted through an insertion hole 181*a*. That is, the light transmitting reinforcing layer 160 may be formed by covering the light transmitting reinforcing material 161 is formed on the outer surface of the first substrate 110 and the second substrate 120 in a state that the first substrate 110 and the second substrate 120 are being bent by the first guide member 140 and the second guide member 150 and then curing the light transmitting reinforcing material 161.

At this time, the light transmitting reinforcing material 161 may be material which can form the reinforcing layer having the light transmitting characteristics, e.g., transparent polymer, glass bonding, or the like. Accordingly, the light transmitting reinforcing layer 160 may be a transparent polymer layer or a glass bonding layer. In addition, the transparent polymer may be any transparent or semi-transparent polymer such as transparent UV resin.

Further, the light transmitting reinforcing layer 160 may be transparent so as to transmit fully light, and if necessary, may be a semi-transparent so as to transmit a portion of light.

Since the light transmitting reinforcing material 161 is being cured, it adheres to the outer surfaces of the light first substrate 110 and the second substrate 120, after the light transmitting reinforcing layer 160 is formed, the first substrate 110, the second substrate 120, and the light transmitting reinforcing layer 160 can be maintained in the desired curved shape.

If the first substrate 110 and the second substrate 120 are bent after being paring the outer surface thereof, they can be bent, but stressful forces may act on the first and second substrates 110, 120. Referring to FIG. 5, the inner side of the first substrate 110 and the outer side of the second substrate 120 which are convex are under tensile stress, and the outer side of the first substrate 110 and the inner side of the second substrate 120 which are concave are under compressive stress. At this time, as shown in FIG. 7, if the light transmitting reinforcing material 161 is inserted and cured, the light transmitting reinforcing material 161 is changed into the light transmitting reinforcing layer 160 which are attached to the outer surfaces of the first substrate 110 and the second substrate 120, so as to disperse or absorb the stress acting on the substrates.

As described above, after parting partially an outer portion of the first substrate 110 and the second substrate 120 to reduce the thickness thereof, by bending the display panel to the desired curved shape, and then by attaching the guide members 140 and 150 and forming the light transmitting reinforcing layer 160, the first substrate 110 and the second substrate 120 can be maintained to the desired curved shape.

Furthermore, a polarizer 170 may be attached to one or more of the outer surfaces of the first guide member 140 and the second guide member 150.

As shown in FIG. 2, FIG. 3, and FIG. 6, the polarizer 170 may be respectively attached to the outer surfaces of the first guide member 140 and the second guide member 150, or may be attached on one of the outer surfaces of the first guide member 140 and the second guide member 150.

The first guide member 140 and the second guide member may be made of glass or acrylic (PMMA, PolyMethly MethAcrylate).

Figure 8:
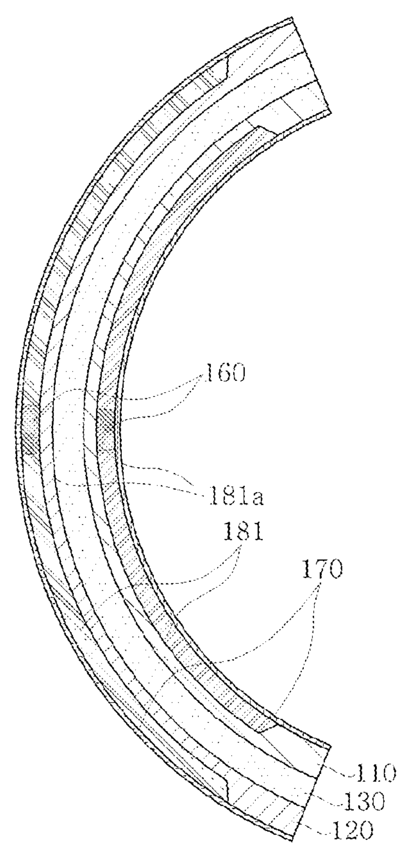
FIG. 8 is a schematic side sectional view of a curved-surface display panel which is formed by a curved-surface display panel fabrication method according to another embodiment of the present invention.

FIG. 8 is a schematic side sectional view of a curved-surface display panel which is formed by a curved-surface display panel fabrication method according to another embodiment of the present invention.

In this embodiment, the first guide member 140 and the second guide member 150 is a polarizer.

In a curved-surface display panel according to an embodiment of the present invention, as shown in FIG. 8, the first guide member 140 and the second guide member 150 is realized as the polarizer 170, without the structure of the plate of glass or acrylic.

The first and the second guide member 150 may include spacers 180 for maintaining a predetermined gap.

That is, in the attaching the guide member (FIG. 6), in order to attach the first guide member 140 and the second guide member 150 to the first substrate 110 and the second substrate 120 with a predetermined gap therebetween, as shown in FIG. 3, the spacers 181 for maintaining the predetermined gap may be attached to an inner surface of the first guide member 140 and the second guide member 150.

Further, the spacer 180 may include side spacers 181 which are disposed at inner edges of the first guide member 140 and the second guide member 150 so as to form the shape of the light transmitting reinforcing layer 160 during the light transmitting reinforcing layer 160.

In the forming the light transmitting reinforcing layer (FIG. 7), when the light transmitting reinforcing layer 160 is formed by inserting the light transmitting reinforcing material 161 into a space formed by the predetermined gap, the shape of the light transmitting reinforcing layer 160 cannot be maintained by itself before the light transmitting reinforcing material 161 is cured. Accordingly, in order to maintain the shape of the light transmitting reinforcing layer 160, as shown in FIG. 2, FIG. 6, and FIG. 7, by disposing respectively the side spacers 181 at the inner edges of the first guide member 140 and the second guide member 150, the light transmitting reinforcing material 161 can be prevented from beileaking before being cured.

That is, the spacer 180 shown in FIG. 3 is a member which is disposed within the space formed by the predetermined gap to maintain the gap, and the side spacers 181 shown in FIG. 2, FIG. 6, and FIG. 7 play not only roles of members which are disposed at both edge portions of the space to maintain the gap but also members for forming and maintaining the shape of the light transmitting reinforcing layer 160.

Further, as shown in FIG. 2, FIG. 6, and FIG. 7, the side spacer 181 may include an insertion hole 181*a* through which the light transmitting reinforcing material 161 is inserted. Not shown in the drawing, after the light transmitting reinforcing material 161 is inserted through the insertion hole 181*a*, the insertion hole 181*a* may be closed for stable forming of the light transmitting reinforcing layer 160.

As such, after reducing the thickness of the first substrate 110 and the second substrate 120 of the conventional display panel by removing partially an outer portion thereof, and in a state of bending the display panel, the guide members 140 and 150 are attached and the light transmitting reinforcing layer 160 is formed, so the display panel having a curved surface can be easily fabricated.

Further, the curved-surface display panel according to an embodiment of the present invention may be fabricated by the fabrication method according to an embodiment of the present invention.

Figure 9:
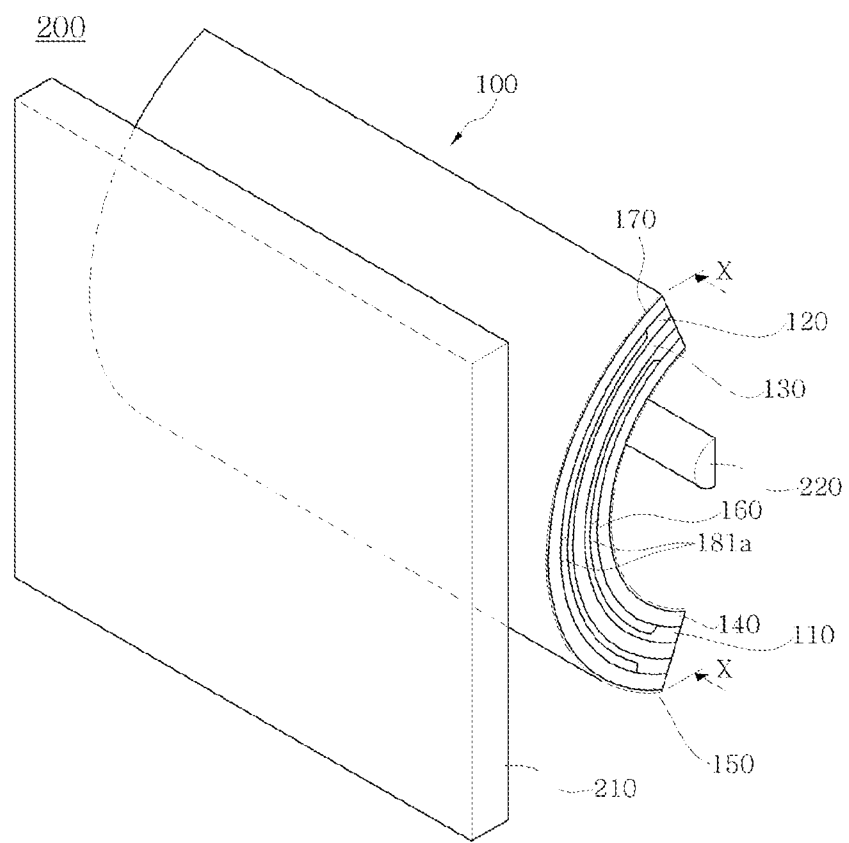
FIG. 9 is a schematic perspective view of a multi-image display device according to an embodiment of the present invention.
Figure 10:
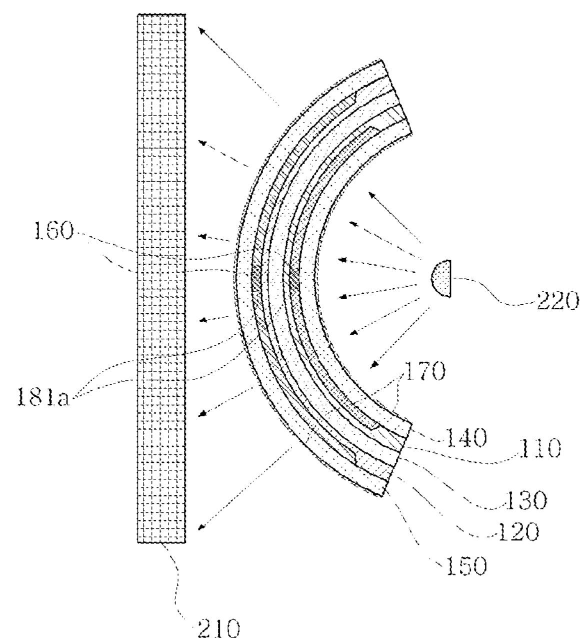
FIG. 10 is a cross sectional view taken along a line—in FIG. 9.

FIG. 9 is a schematic perspective view of a multi-image display device according to an embodiment of the present invention, and FIG. 10 is a cross sectional view taken along a line—in FIG. 9.

A multi-image display device 200 according to an embodiment of the present invention realizes a multi-layered image with a depth by overlapping two-dimensional images, and includes a curved-surface display panel 100 which is fabricated by the curved-surface display panel fabrication method, and a flat display panel 210 which is disposed in front of the curved-surface display panel 100 in a state of being overlapped with the curved-surface display panel 100 in a forward-backward direction.

As shown in FIG. 9 and FIG. 10, the curved-surface display panel 100 is disposed behind the flat display panel 210 such that the flat display panel 210 and the curved-surface display panel 100 are seen from the front to be overlapped with each other. At this time, the flat display panel 210 and the curved-surface display panel 100 are disposed to be apart from one another such that images displayed on the flat display panel 210 and the curved-surface display panel 100 are overlapped with a depth.

Further, although a light source 220 is additionally shown in FIG. 9 and FIG. 10, the multi-image display device 200 may further include various parts for realizing a conventional display device such as a backlight unit, optical sheets, etc.

The flat display panel 210 may be a conventional liquid crystal display panel. For example, the flat display panel 210 may include a pair of transparent substrates facing with each other and a liquid crystal layer interposed between the substrates, and may include various electrodes for driving the liquid crystal layer.

A frame for fixing the flat display panel 210 and the curved-surface display panel 100 is omitted in the drawing.

Further, the flat display panel 210 may be formed to be selectively transparent such that the image displayed on the curved-surface display panel 100 can be seen at the front.

A conventional multi-layer display device, as one of the conventional art to realize a multi-layer image, which is realized by overlapping a plurality of flat liquid crystal display panel has a problem that an image noise (interference pattern) such as wood grain or water wave may occur due to the interference between the pixel patterns of the overlapped liquid crystal display panels. In order to prevent such noises, a technology in which a diffuse layer which diffuses light is interposed between the two flat liquid crystal display panels has been introduced, but because of the diffuse layer between the liquid crystal display panel, the assembling process becomes complicated and the productivity is deteriorated.

Compared to such a conventional art, the multi-image display device 200 according to an embodiment of the present invention, as shown in FIG. 9 and FIG. 10, the rear display panel of the two flat display panels is replaced with the curved image display panel 100 according to an embodiment of the present invention, so the problem of the interference patterns can be solved and at the same time the assembling process can be simplified.

That is, in a conventional multi-image display device, the interference pattern is generated due to minute differences between the two pixels patterns of the overlapped flat liquid crystal display devices such as distance difference due to disposition location. On the other hand, since the pixel pattern of the curved-surface display panel 100 is curved to be distorted according to the curved shape, the difference between the pixel patterns of the flat display panel 210 and the curved-surface display panel 100 which are overlapped with each other becomes great beyond the minute difference, so the occurrence of the interference pattern can be prevented.

In a method of interposing a diffuse layer between the two liquid crystal display panels, the overlap of the pixel patterns which are minutely different is not prevented, so it has only the effect that the interference pattern can only be weakened. However, in the present invention, the overlap of the two pixels patterns which are minutely different is removed, so the occurrence of the interference pattern can be more effectively prevented.

As such, by using the curved-surface display panel 100 as a rear display panel of the multi-image display device, the occurrence of the interference pattern (Moire phenomenon) due to the interference of the different pixel patterns can be prevented, and since an additional diffuse layer is not needed, the assembling process of the multi-image display device can be simplified.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

The present invention relates to a display having a curved shape and can be applied to various displays, so the present invention has an industrial applicability.

The invention claimed is:

1. A curved-surface display panel fabrication method for fabricating a curved-surface display panel having a desired curved shape using a flat display panel having a first substrate and a second substrate, the method comprising:

- paring partially outer surfaces of the first substrate and the second substrate so as to reduce thicknesses of the first substrate and the second substrate to a predetermined thickness;
- bending the pared flat display panel to the desired curved shape;
- attaching a first guide member, which has a shape corresponding to the desired curved shape, to the first substrate with a predetermined gap from the pared outer surface thereof and attaching a second guide member, which has a shape corresponding to the desired curved shape, to the second substrate with a predetermined gap from the pared outer surface thereof;
- injecting light transmitting material respectively in a space between the first guide member and the first substrate and a space between the second guide member and the second substrate; and
- curing the injected light transmitting material to form light transmitting reinforcing layers.

2. The curved-surface display panel fabrication method of claim 1, wherein the predetermined thickness is in a range of 50 to 200 μm.

3. The curved-surface display panel fabrication method of claim 1 further comprising attaching a polarizer on at least one outer surface of outer surfaces of the first guide member and the second guide member.

4. The curved-surface display panel fabrication method of claim 1, wherein the first guide member and the second guide member are made of glass or acrylic (PMMA, PolyMethly MethAcrylate).

5. The curved-surface display panel fabrication method of claim 1, wherein the first guide member and the second guide member each respectively comprise a spacer to maintain the predetermined gap.

6. The curved-surface display panel fabrication method of claim 5, wherein the spacers comprise side spacers which are respectively disposed at inner edges of the first guide member and the second guide member to maintain the light transmitting reinforcing layers while the light transmitting reinforcing layers are being formed.

7. The curved-surface display panel fabrication method of claim 6, wherein each of the side spacers comprises an insertion hole through which the light transmitting material for forming the light transmitting reinforcing layers is inserted.

8. The curved-surface display panel fabrication method of claim 1, wherein the first guide member and the second guide member are polarizers.

9. A curved-surface display panel fabricated by the curved-surface display panel fabrication method of claim 1.

10. A multi-image display device for realizing a multi-layer image with a depth by overlapping a plurality of two-dimensional images, comprising:

- a curved-surface display panel which is fabricated by the curved-surface display panel fabrication method of claim 1; and
- a flat display panel which is disposed in front of the curved-surface display panel so as to be overlapped with the curved-surface display panel in a forward-backward direction.

11. A curved-surface display panel which is fabricated from a flat display panel having a first substrate and a second substrate facing each other, comprising:

- the first substrate and the second substrate, outer surfaces of the first and second substrates being partially pared and bent to have a desired curved shape;
- first and second guide members which have respectively a shape corresponding to the desired curved shape, the first and second guide members being fixed respectively to the first substrate and the second substrate in a state of being apart from the pared outer surfaces of the first substrate and the second substrate to form a space between the first guide member and the first substrate and a space between the second guide member and the second substrate; and
- light transmitting reinforcing layers formed in the spaces, wherein the light transmitting reinforcing layers are respectively formed by injecting light transmitting material respectively in the space between the first guide member and the first substrate and the space between the second guide member and the second substrate, and curing the injected light transmitting material.

12. The curved-surface display panel of claim 11, wherein the guide member is a polarizer.

13. The curved-surface display panel of claim 11, wherein the first and second guide members each comprises a spacer for maintaining a distance to one of the first substrate and the second substrate.

14. The curved-surface display panel of claim 13, wherein each of the spacers comprises a side spacer which is disposed at an inner edge of one of the first guide member and the second guide member to maintain the light transmitting reinforcing layers while the light transmitting reinforcing layers are being formed.

15. The curved-surface display panel of claim 11, wherein the light transmitting reinforcing layers are in direct contact with each of the pared first and second substrates, and the first and second guide members.

16. The curved-surface display panel fabrication method of claim 1, wherein the first guide member and the second guide member are made of glass or PolyMethly MethAcrylate.

17. A curved-surface display panel fabrication method for fabricating a curved-surface display panel using a flat display panel having a first substrate and a second substrate, the method comprising:

partially paring an outer surface of the first substrate so as to reduce a thickness of the first substrate to a predetermined thickness;

partially paring an outer surface of the second substrate so as to reduce a thickness of the second substrate to another predetermined thickness;

bending the pared first and second substrates to a desired curved shape;

attaching a first guide member, having a shape corresponding to the desired curved shape, to the first substrate with a predetermined gap from the pared outer surface of the first substrate;

attaching a second guide member, having a shape corresponding to the desired curved shape, to the second substrate with a predetermined gap from the pared outer surface of the second substrate;

inserting light transmitting reinforcing material in both a space between the first guide member and the first substrate, and a space between the second guide member and the second substrate; and curing the injected light transmitting reinforcing material to form light transmitting reinforcing layers.

18. The curved-surface display panel fabrication method of claim 17, wherein the light transmitting reinforcing layers are in direct contact with each of the pared first and second substrates, and the first and second guide members.

* * * * *